Dec. 25, 1934.   R. A. CARLETON   1,985,280
ELECTRIC FLUID HEATER
Filed Sept. 12, 1931   4 Sheets-Sheet 2
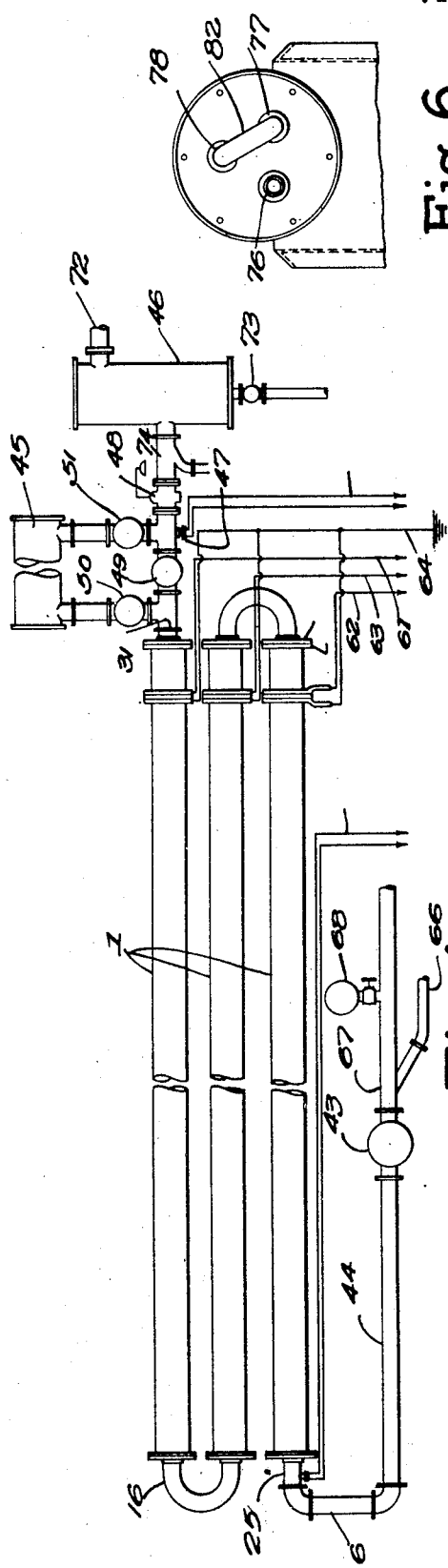
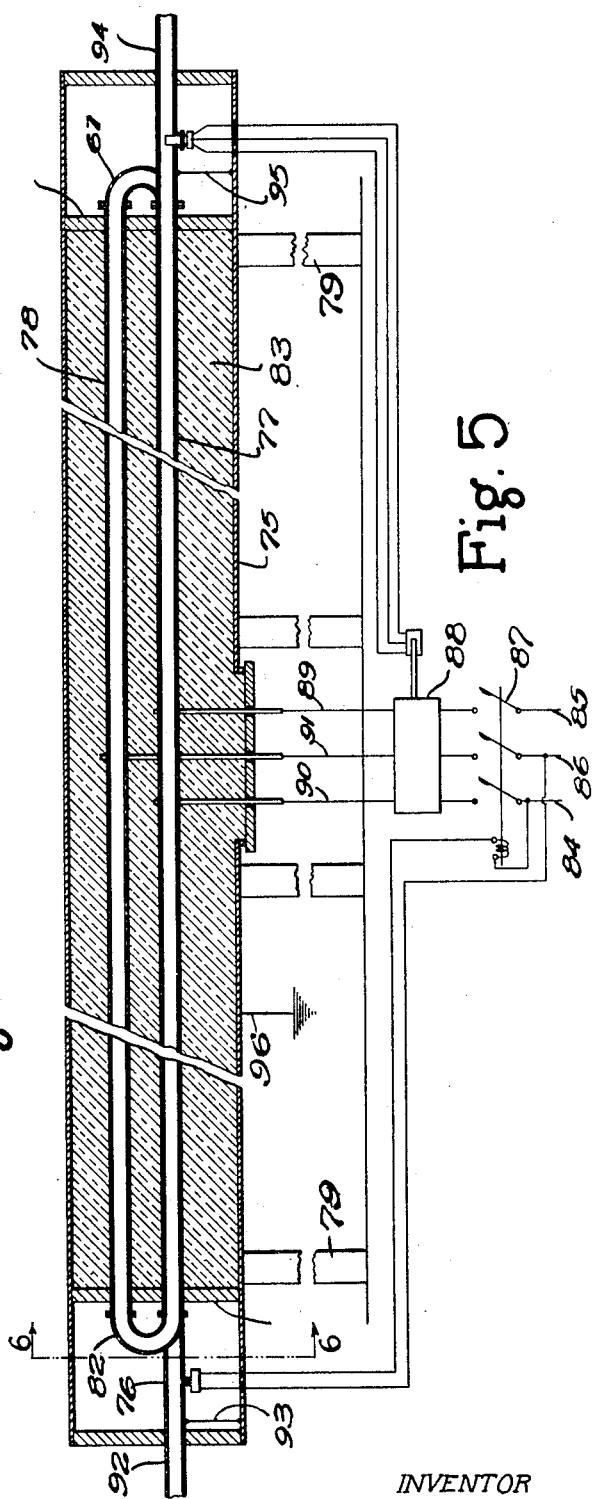
INVENTOR
ROBERT A. CARLETON
BY
Pennie, Davis, Marvin & Edmonds.
ATTORNEYS

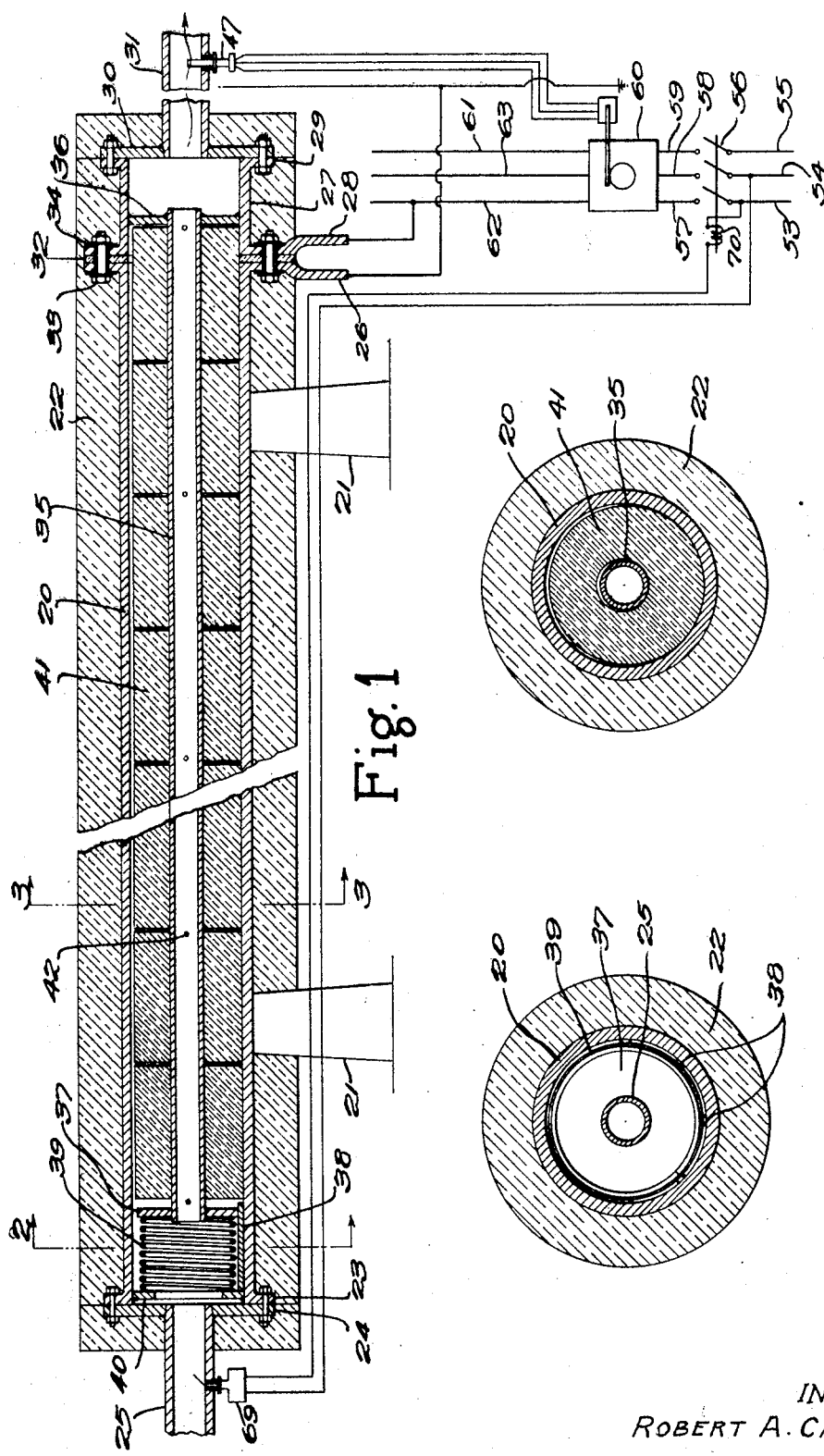

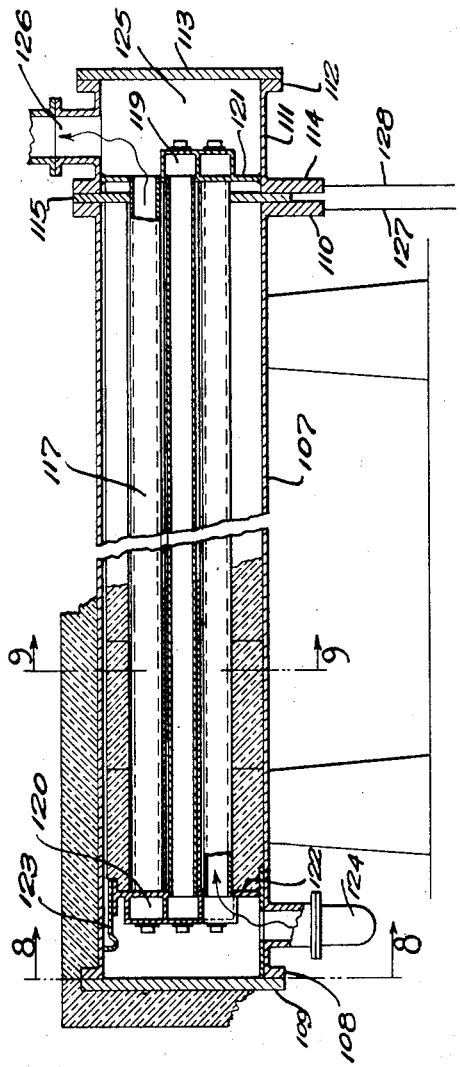

Dec. 25, 1934.    R. A. CARLETON    1,985,280
ELECTRIC FLUID HEATER
Filed Sept. 12, 1931    4 Sheets-Sheet 4

INVENTOR.
ROBERT A. CARLETON
BY
Pennie, Davis, Marvin & Edmonds.
ATTORNEYS

Patented Dec. 25, 1934

1,985,280

UNITED STATES PATENT OFFICE 1,985,280

ELECTRIC FLUID HEATER

Robert A. Carleton, Brooklyn, N. Y., assignor to National Electric Heating Company, Inc., New York, N. Y., a corporation of New Jersey Application September 12, 1931, Serial No. 562,541

21 Claims. (Cl. 219—39)

This invention relates to improvements in methods and apparatus for continuously treating fluids at high temperatures under high pressures.

More particularly this invention is concerned with the provision of a method and apparatus for continuously treating fluids by electrically heating the same to a selected reaction temperature within an available range up to 2500° F., and at a pressure within an available range up to 7500 pounds per square inch, correlated to the said selected temperature to produce a desired reaction in the fluid.

The object of the invention is to provide a method and apparatus for the treatment of gases, liquids, and other fluids in which the fluid may be quickly heated to a selected high reaction temperature under high pressure, and thereafter quickly cooled below said reaction temperature to terminate said reaction, without the danger and hazard inherent in methods and apparatus heretofore employed.

This invention provides a method and apparatus in which a relatively high rate of heat input may be utilized and the fluid caused to pass through the heating means at a rapid rate of flow, thus exposing the fluid to the action of the heated surface for the minimum period of time, and in which a proper correlation may be maintained between the selected reaction temperature to which the fluid is subjected and the pressure under which it is caused rapidly to flow, so as to maintain substantially constant the conditions under which the said reaction takes place.

A further object of the invention is to provide a method and means to vary the rate of flow of the fluid after being heated to the selected reaction temperature, under substantially the same pressure, to permit completion of the desired reaction.

The invention also provides for accelerating and increasing or modifying the reaction or conversion caused to take place in the fluid, by the introduction of reagents such as free hydrogen or hydrogen-forming compounds into the fluid, before or during the period in which it is subjected to the reaction temperature, and for the introduction into the fluid, either alone or with the hydrogen, of a suitable catalyst, that will affect the reaction of the fluid.

The invention also provides an electric fluid heating apparatus in which the electric heating current supplied the heating elements is controlled by thermostatic means according to the temperature of the fluid discharged from the heater, and means operable by the flow of fluid through the heating elements to permit supply of electric current only when the fluid is flowing.

The apparatus of the invention may be constructed to have a small or large capacity, is simple and rugged in construction and arrangement, so that it will be durable in service and will operate efficiently and economically, and is constructed of non-corrosive materials not easily affected by chemical or other action of the fluid being heated, will not burn out or require replacement from overheating, and can be arranged to operate on any available electric heating current.

These and other features of the invention will more fully appear from the following description, and accompanying drawings, and will be particularly pointed out in the drawings.

The embodiments of the invention, as illustrated in the accompanying drawings, are particularly adapted to the treatment of gases and vapors at high temperature and pressure, such as the intensive cracking of oil; the treatment, distillation and evaporation of fluids and compounds requiring intense heat; and many other useful applications in industrial and manufacturing processes.

Suitable apparatus for performing the method aforesaid are disclosed in the accompanying drawings, in which:

Figure 1 shows a simplified form of apparatus which is illustrated mainly in horizontal section, with means for electrically heating the fluid and the mechanism for supplying heating current, graphically illustrated.

Fig. 2 is a vertical sectional view on line 2—2 of Fig. 1.

Fig. 3 is a vertical sectional view on line 3—3 of Fig. 1.

Fig. 4 is a plan view of the fluid heating apparatus embodying a plurality of heating units of the type illustrated in Fig. 1.

Fig. 5 is a vertical sectional view of a modified form of fluid heating apparatus.

Fig. 6 is a vertical sectional view on line 6—6 of Fig. 5.

Fig. 7 is a vertical sectional view of a different form of fluid heating apparatus.

Fig. 8 is an end view of the construction illustrated in Fig. 7, the end plates of the casing being removed.

Fig. 9 is a vertical sectional view on line 9—9 of Fig. 7.

Fig. 10 is a diagrammatic plan view of apparatus arranged for the treatment of gases and vapors under a high degree of heat and pressure.

Figure 11:
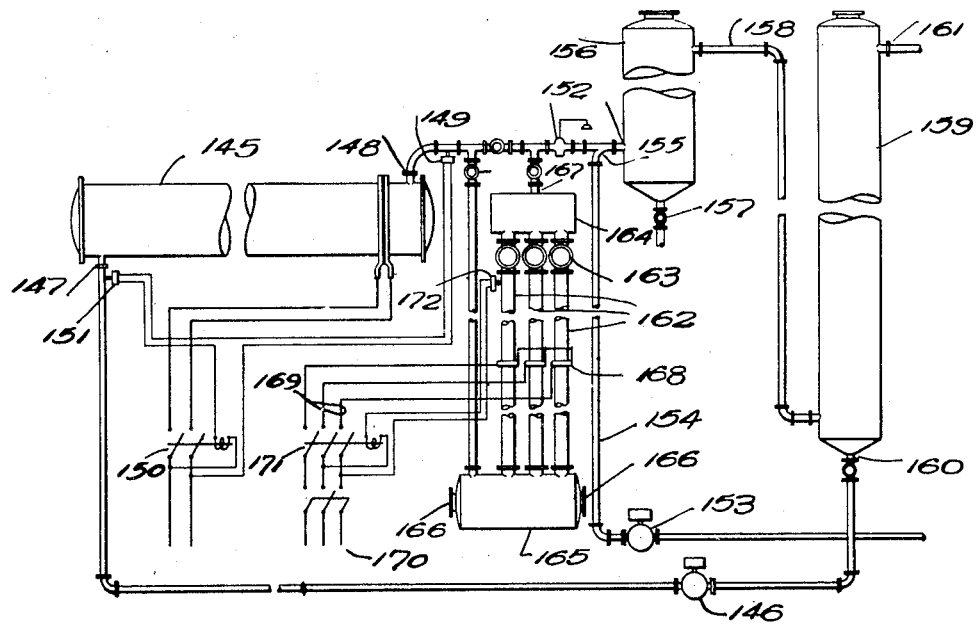
Fig. 11 is a diagrammatic plan view of a fluid heating apparatus of the type illustrated in Fig. 1, arranged for cracking hydrocarbon oils.

In the simple construction illustrated in Fig. 1 a rigid tubular metallic casing 20, having a relatively thick wall, is supported upon suitable piers 21, and covered with heat insulating material 22. The main portion of the casing 20 is provided at one end with an annular flange 23 which may be formed integral with the casing, or preferably welded to it, and this flange is connected to the flange 24 of an inlet pipe 25. The main portion of the casing 20 is provided at its opposite end with a similar flange 26 also formed integral with or welded to the main portion 20 of the casing.

The casing is provided with an extension 27 having at its inner end a flange 28 similar to the flange 26, and at its outer end a flange 29 to which is connected a flange 30 of an outlet pipe 31. The flange 28 is electrically insulated from the flange 26 by the interposition of suitable insulation 32, and the bolts 33, which connect the flanges 26 and 28 together, are insulated from the flanges by sleeves and washers 34 of mica or other suitable electrical insulation.

The conduit for the fluid thus formed is capable of withstanding very high pressures and within it is housed means for quickly heating the rapidly flowing fluid to higher temperatures under higher pressures than have heretofore been safely attained.

This means, as shown in the accompanying drawings, comprises a heater tube 35 having a relatively thin wall of high electrical resistance metal such as chrome nickel alloy or other suitable material, which extends longitudinally of the main portion of the casing 20 and concentrically with respect thereto, and is electrically and mechanically connected at its outlet end by a metal disk or spider 36 to the extension 27 of the casing. At the inlet end, the heater tube 35 is preferably rigidly connected to a ring or plate 37 slidably mounted upon guides 38 located within the lower portion of the casing 20, to permit the relative movement between the heater tube and the casing caused by the greater expansion of the heater tube when subjected to high temperatures. A spiral conductor 39 of suitable metal, is welded or otherwise connected to the ring 37 and to a ring 40 which is welded to the wall of the casing 20, thereby providing a flexible electrical connection between the inlet end of the heater tube 35 and the casing at the inlet end.

Suitable electric and thermal insulation substantially fills the space between the heater tube 35 and the casing 20. This insulating material preferably comprises cylindrical sections 41 of fire-brick, lava, or other refractory electrical insulating material which fit rather loosely within the annular space between the heater tube and the casing, thus serving to support the heater tube and also to insulate it from the casing 20. This insulating material has the principal function of preventing over-heating of the wall of the casing 20 by insulating it against the heat admitted by the heater tube 35. Apertures 42 through the wall of the heater tube permit the fluid to flow into the space between the heater tube and the casing, thereby equalizing the pressure upon the outer and inner surfaces of the relatively thin wall of the heater tube, and preventing distortion or rupture of the heater tube.

As shown in Fig. 4, the fluid is forced by a pump 43 or other suitable pressure producing means through a pipe 44 into the inlet end of one of a plurality of heater tubes, arranged in series. The fluid is forced through the tubes by the pump at a rapid rate under high pressure. It may then be heated to a selected high reaction temperature of between 300° F. and 2500° F. by the electrical heater tubes 35, and passed from the heater tubes through the outlet pipe 31.

The heater tube may be of any desired length, the diameter and length of the heater tube and the temperature to which it is raised preferably being such that the fluid is raised to the reaction temperature within but a few seconds and then discharged into reactor 45 or expansion chamber 46.

A thermostat 47, which is subject to the temperature of the fluid discharged from the heater tube, acts to control the current supplied to the heater tube to maintain the selected reaction temperature of the fluid substantially uniform, and a back pressure device, or preferably a loaded valve 48, serves to maintain the desired pressure upon the rapidly flowing fluid which passes through the heater tube.

In some instances, as when treating certain types of fluid, it is desirable that the fluid be immediately cooled or discharged into the expansion chamber, while in other instances or when treating other fluid it is desirable that the fluid shall be maintained at a reaction temperature for a definite period of time to further extend the cracking reaction.

As illustrated in Fig. 4, means are provided for accomplishing both these purposes. A by-pass 49 passss the fluid directly from the heater to the back pressure valve 48 and the expansion chamber, and when the by-pass is closed the fluid is passed through the reactor 45. Valves 51 and 52 in the pipes leading to and from the reactor control the flow of fluid therethrough.

The reactor 45 preferably is in the form of a cylindrical chamber having walls of sufficient thickness and strength to withstand the high pressure and temperature, and of a diameter sufficiently greater than the diameter of the heater tube to reduce the rapidity of flow through the reactor to cause the fluid to remain in the reactor a predetermined period of time necessary for the completion of the desired reaction to take place.

Suitable heating means (not shown) such as electric heating mechanism may be provided to maintain the fluid in the reactor at a substantially constant predetermined reaction temperature, or such other temperature as may be necessary to effect the purposes above set forth.

It will be noted that the pressure upon the fluid in the heater tube is maintained in the reactor by means of the fact that the loaded valve 48 is interposed between the delivery end of the reactor and the expansion chamber 46, so that the conversion or other reaction produced by quickly heating the fluid to the selected temperature is continued throughout the period that the fluid remains in the reactor.

As illustrated in Figs. 1 and 4, a three-phase current is supplied through conductors 53, 54 and 55, to a switch 56, to conductors 57, 58 and 59, which lead to a suitable variable voltage device, such as an autotransformer or a voltage regulator 60. As illustrated in Figs. 1 and 4, conductors 61 and 62 for the heating current lead to the flanges 26 of the outer heater tubes, while the conductor 63 leads to the flange 9 of the intermediate heater tube. The flanges 26 of all of the heater tubes are connected together by conductors 64 which are grounded.

By reason of the fact that the electric current flows in opposite directions through the heater tube and the casing in parallelism, self-induction is substantially neutralized.

The mechanism of the voltage regulator 60 is controlled by the thermostat 47, which is subjected to the temperature of the fluid discharged from the heater and serves to regulate the current supplied to the heater tube to produce the desired rapid uniform heating of the fluid to the selected temperature.

In order to facilitate the reaction of the oil or other fluid, it is sometimes necessary to introduce free hydrogen and/or a catalyst, into the fluid before it is forced into the heater tube. Means for conveniently accomplishing this is provided by a pipe 66 leading to the inlet pipe 67 of the pump 43. A tank 68 may also be connected to the inlet pipe 67 to supply additional or other reagents.

In order to protect the heater tube from becoming overheated by cessation or diminution of the flow of fluid through the heater tube, an automatic safety switch 69 is located in the inlet pipe 25 and operates through a solenoid 70 to open the switch 56 upon cessation or dangerous reduction of flow of the fluid.

In the operation of the device the fluid is forced through the conduit, including the heating section thereof, at a predetermined pressure, and the current supplied to the heating tube is automatically regulated to supply to the fluid sufficient heat to raise it quickly to the selected temperature as it flows rapidly through the heater tube, and to maintain the same substantially at said selected temperature.

The fluid heated to the desired temperature may be directly discharged into the expansion chamber, as above described, or may be caused to flow through the reactor in which it will be maintained at a predetermined reaction temperature for such period of time as is necessary to produce the desired reaction which may vary from a fraction of a second to several minutes or more, depending upon the type of fluid and results desired. It is then discharged into the expansion chamber in which its temperature is reduced below the reaction temperature and the products collected and discharged through the outlet 72 of the expansion chamber to such usual cooling, condensing, or fractioning apparatus as is well known in the art. The residuum or unvaporized material which accumulates in the expansion chamber 46 may be drawn off through a suitably valved outlet pipe 73.

Under certain conditions it is necessary to quickly cool the fluid discharged from the heater or reactor below the reaction temperature to terminate said reaction and means are, as illustrated in Fig. 4, provided for accomplishing this purpose.

A mixing device 74 comprises means to spray and mix a cooling fluid with the hot fluid discharged from expansion valve 48, whereby the resulting mixture discharged to expansion chamber 46 is cooled below the reaction temperature. The cooling fluid may be of any suitable nature, but preferably comprises the same fluid as that being treated.

It is obvious that under certain conditions it will be desirable to cool the hot treated fluid under pressure before passing through relief valve 48, and this may be readily done by causing the heated fluid to flow through a mixing device before passing through relief valve 48, so that a suitable cooling fluid may be mixed therewith to reduce the temperature.

If a cooling fluid is used that will not vaporize at the resultant temperature of the mixture, the cooling fluid may be recovered from the base of expansion chamber 48 and cooled by means of suitable cooling or radiating means, and recirculated through mixing device 74.

In Figs. 5 and 6 a modified form of apparatus, similar in many respects to that shown in Figs. 1 to 4, is illustrated which is adapted both for the cracking of oil and also for high temperature distillation as in the manufacture of lubricating oils, fatty acids, glycerine, and similar operations, which by reason of the high speed of heating the oil, or other material, requires but a few seconds to pass the fluid from the inlet to the outlet of the heater during which time it is raised to the high closely controlled temperature necessary, and is discharged into an expansion or reaction chamber where the vapors are removed in the manner already described, and the residuum or bottoms of the desired viscosity or gravity withdrawn. This comprises a rigid cylindrical casing 75 and a plurality of heating sections 76, 77 and 78 are supported upon insulating supports 79 in triangular equally spaced relation with each other, and in substantial parallelism with the axis of the casing. These heating tubes are connected by return bends 81 and 82, and the space between the tubes and the inner surface of the casing is filled with suitable thermal and electrical insulating material 83.

The heating current is supplied through conductors 84, 85 and 86, through a switch 87 to a suitable voltage regulator or other power regulating device 88, the current then passing through conductors 89 and 90 to the central portion of the heating tubes 76 and 77, while the return conductor 91 is connected to the central portion of the heating tube 78. The inlet conduit 92, which leads to the heating tube 76, is connected by a conductor 93 to the casing and the outlet conductor 94, leading from the heating tube 77, is likewise electrically connected to the casing by a conductor 95. The casing 75 is grounded by a conductor 96.

In this construction the electric current passes directly through the heating tubes, the ends of which are of the same electrical potential and together with the outer casing are grounded. The oil or other liquid is supplied to the heating tubes in the same manner and the heated fluid is discharged through the outlet conduit 94 either to a reactor or to an expansion chamber in the manner above described.

In Figs. 7, 8 and 9 a modified form of apparatus for performing the process above described is illustrated, in which a plurality of tubular heating sections are contained in a single casing and are suitably electrically and heat insulated therefrom. In this construction a different circuit for supplying the heating current to the heating tubes is also illustrated.

This construction is designed to permit the heater tubes to be operated at any temperature up to 2500° F. with safe pressure up to 7500 lbs. or more.

This construction comprises a rigid cylindrical casing having relatively thick walls of metal capable of withstanding high pressures at elevated temperatures, the casing comprising a main section 107 having at one end a flange 108 to which is secured a head plate 109, and at the opposite end a flange 110. The casing also comprises an extension 111 having a flange 112 to which is secured a suitable head plate 113 and a flange 114 which lies in proximity to the flange 110 upon the main portion of the casing. An electric insulating gasket 115 is clamped between the flanges 110 and 114 by suitable insulated bolts as above described.

A plurality of heating tubes 117 are connected in series by return conduits 118 as shown in Figure 8, or may be provided as shown in Fig. 7 to permit the liquid to flow through the tubes in series. The tubes are rigidly supported at one end by metal supporting plates 121 which are mechanically and electrically connected to the extension 111 and at the opposite end are supported upon a metallic plate 112 which is slidably mounted upon guides within the main portion of the casing 107, to permit relative movement of the heater tubes and casing required by the expansion of the heater tubes when raised to high temperatures. The supporting plate 122 is electrically connected by conductor 123 to the casing.

In this construction the liquid is supplied through an inlet tube 124 at one end of the casing, whence it flows into the open end of the first of the series of heating tubes. The last of the series of heating tubes discharges into the chamber 125 at the opposite end of the casing and the heated liquid flows from the chamber 125 through the inlet 126 to the expansion chamber as heretofore described.

Insulation 129 comprising moulded fire brick, lava, or other material having suitable thermal and electric insulating characteristics substantially fills the annular space between heater tubes 117 and casing 107, and serves to support heater tubes 117 and to heat insulate the wall of casing 107 from the effect of the heat radiated from the surfaces of said heater tube.

The electric heating current is supplied to the flange 110 of the casing and the flange 114 of the extension thereof through conductors 127 and 128.

This type of heater can be constructed in a relatively long form, thus reducing its diameter for a given capacity and greatly increasing the factor of safety; also reducing the number of tubes and return fittings required and the power required for liquid circulation, and as there is no fire hazard or danger as when heating by direct fire, the apparatus can be installed in buildings, in underground vaults or in locations where it would be impossible or hazardous to install usual types of heaters.

If desired, a plurality of heaters of this type may be connected in series, thereby reducing the length of the casings and permitting one of the heating devices to be used to preheat the liquid supplied to the other, the vapors being removed at each heating stage or section.

The apparatus may be provided with means for automatically controlling the supply of electric current to the heating tubes, means for automatically regulating the current; means for forcing oil under high pressure through the heating tubes; as well as an expansion chamber and a reactor as desired.

Fig. 10 illustrates an arrangement of apparatus as employed in the treatment of gas and vapors, such as the waste gas from oil cracking stills, natural gas from oil wells and gases or vapors resulting from numerous manufacturing and industrial process operations, but its use will be described with particular reference to the cracking and polymerizing of the so-called uncondensible gases from oil cracking and refining operations.

In the production of gasoline by the cracking or pyrogenic conversion of high boiling hydrocarbons to those which have the desired low boiling characteristics, there results from the reaction, in addition to considerable carbon, a relatively large quantity of fixed or uncondensable gas consisting principally of methane and aromatic hydrocarbons which under present conditions have little or no value and are usually disposed of by burning under the stills or boilers of the plant as fuel.

When these gases are exposed to a high degree of heat they crack or polymerize, the molecular change forming compounds that may be recovered in a liquid form and that may be used for many useful industrial and manufacturing purposes.

The volume of the gas so produced is considerable, particularly in the production of gasoline by the cracking of hydrocarbons in the vapor phase, which reaction usually results in high fixed gas loss, which may be equivalent to 30% or more of the volume of oil treated, representing a tremendous loss but one of which a substantial part may be recovered by suitable apparatus and method.

The preferred method of treating such gas is by subjecting it to a cracking or reaction temperature of 1400 to 2000 degrees Fahrenheit under a pressure of 300 to 600 lbs., or more per square inch, the temperature and pressure depending upon the constituents of the gas and the end products desired. When treating such gases at the above temperature the molecular change or reaction proceeds at a very high velocity and to obtain the maximum yield and quality it is essential that the temperature to which they are exposed be uniform and very closely regulated, and that the pressure be closely correlated to the optimum temperature and time of exposure of the gas to the heat reaction.

Heretofore, such operations have been performed in tubes of heat resisting metal placed in a brick setting and heated by oil or gas fire, and the gas or vapor heated by being circulated therethrough, but the maximum temperature that such tubes can be operated at, due to the metal oxidizing and scaling, is 1500° to 1650° F., under which conditions the life of the tube is relatively short, and due to the weakening effect of the heat to which the metal of the tube is exposed, the pressure at which the gas is passed through the tube must not greatly exceed that of atmosphere.

By compressng the gas and treating it under pressure the reaction will proceed in a more definite and orderly manner and the extent of the polymerizing reaction can be more readily controlled, greatly increasing the yield and quality of the desired end products.

Compressing the gas and treating it under high pressure in the apparatus which I am about to describe, permits the employment of smaller and less expensive equipment to treat the same quantity of gas and due to better heat transfer conditions reduces the amount of heat required for the reaction.

The apparatus illustrated in Fig. 10 is particularly adapted to such purpose and comprises an electric fluid heater 131 of the type illustrated in Fig. 1 of the drawings. The heater tube 16 is constructed of chrome nickel alloy for operating temperatures up to 2000° F. and for higher temperatures the tube would preferably be constructed of non-metallic material having suitable electrical resistance and ability to withstand the corrosive effects of the gas or fluid being treated. Such a material as carbon or silicon carbide would in certain instances be suitable.

As in the embodiment shown in Fig. 1, openings are provided through the walls of the heater tube to permit a portion of the gas to pass into the space between the heating tube and the casing by means of which the pressure imposed upon the walls of the heating tube is substantially neutralized, thereby eliminating any possibility of damage or distortion of the heater tube by reason of the pressure of the gas flowing therethrough.

Insulating material of a relatively porous type fills the annular space between the heating tube and outer metallic casing, serving to support the heater tube and to heat insulate the wall of the outer casing from the effect of the highly heated conduit.

The construction described permits the heating tube to be operated at a high degree of heat, for instance at 2200° F., and by reason of the heat insulating material interposed between it and the outer casing, the outer casing will be heated to but approximately 200° above that of the surrounding air, thereby making it possible to economically construct the outer casing of common construction materials to resist any desired internal pressure.

Pyrometer 132 is provided, subjected to the temperature of the wall of heating tube, and acts by means of magnetic switch 133 to disconnect the electric heating current in the event the flow of gas should cease or diminish to a degree that may cause overheating of the heating tube.

Pyrometer 134 is provided subjected to the temperature of the gas discharged from outlet 135 of the heater tube, and acts to so regulate the heating current supplied the heater tube that the temperature of the gas discharged therefrom will be maintained at a substantially determinate degree of heat.

The gas to be treated is forced by means of pump 136 at a pressure correlated to the desired reaction temperature through heat exchanger 137, where it is subjected to the heat of the hot gas discharged from outlet 135 of the heater tube, thereby becoming heated and cooling the cracked gas. The preheated gas then passes by means of pipe 137 to inlet 138 of the heater tube, passing therethrough and being heated to the desired reaction temperature, and flows by means of outlet 135 through conduit 139 to inlet 140 of the heat exchanger or cooler 137, passing therethrough and being cooled by heat exchange with the fresh incoming gas flowing countercurrent thereto.

Under certain conditions it may be desirable to reduce the pressure of the gas immediately after passing from the heater, in which event the pressure releasing valve would be placed between the heater outlet and the inlet to the heat exchanger or cooler.

The cooled gas is discharged from heat exchanger 137 by means of outlet 141 through pressure releasing valve 142, passing to the usual oil scrubbing tower, condensing and recovery system as is commonly used for the purpose.

Fig. 11 illustrates an arrangement of apparatus for cracking or conversion of hydrocarbon oils to convert high boiling to low boiling hydrocarbons of the naphtha or gasoline series.

In the continuous cracking or pyrogenic treatment of hydrocarbon oils for the conversion of high boiling point compounds to those having a lower boiling point of the naphtha or gasoline series, the oil is circulated through fire tube stills and heated to a desired reaction temperature under sufficient pressure to maintain the oil substantially in the liquid phase.

The stills usually comprise a plurality of steel tubes mounted in a brick setting and heated by means of oil or gas fire, the oil being circulated through the tubes under pressure varying between 250 to 950 lbs. per square inch, and discharged at temperatures varying between 750° to 925° F., the pressure and temperature depending upon the process used, the type of oil, and the results desired. The hot oil and vapors are then discharged from the tube still to a reactor and maintained for a definite period of time for the required reaction or conversion of the oil to take place.

In such construction the temperature to which the oil can be heated and the pressure under which it can be safely maintained, is limited by the strength of the steel tubes at elevated temperatures, temperatures of 850° F. at 1000 lbs. per square inch being considered the maximum safe limits at which such apparatus may be operated, as even when operating under conditions of lower temperature and pressure, failure of the tubes frequently occurs by reason of oxidation or scale forming on the outer surface with the consequent reduction in area, or carbon forming on the inner surface of the tubes insulating the metal from the cooler oil, and as the tubes are exposed to the intense heat of the furnace, the tube walls become overheated and reduced in strength until one or more of them yield to the pressure within the still, thereby releasing into the fire a large quantity of oil heated to a temperature greatly above its boiling point, resulting in explosion and fire, causing loss of property and frequently loss of life.

In usual constructions the oil after being heated is maintained at the desired temperature for a considerable period of time, requiring in some methods several minutes, in others a half hour or more, to permit the completion of the cracking reaction, the greater the temperature under which the oil is treated, the less time being required for the required reaction.

In such process, it is desirable to produce the maximum yield of low boiling compounds of the gasoline series having the maximum anti-knock value and the minimum amount of fixed gas and compounds that may require removal in subsequent refining operations, or that may form gum and other undesirable compounds when used, or in storage.

At the higher temperatures the pyrogenic or cracking reaction is more extensive and rapid, the speed of reaction or molecular change being approximately doubled for each 18 degrees Fahrenheit increase in temperature and the proportion of the oil converted from high to low boiling point hydrocarbons and gasoline, aromatics and unsaturated compounds having high anti-knock properties is greatly increased, and also that when treating the oil at high temperatures it is desirable to subject it to a pressure sufficiently high to maintain the low boiling compounds in solution, thereby reducing the possibility of recracking the more sensitive vapors with the resultant formation of carbon, fixed gases and other undesired decomposition products.

As an illustration of the improvement in yield and quality by treating the oil under the higher pressures and temperatures, the following example is cited:

A 44 A. P. I. gravity Pennsylvania gas oil is treated in a well known commercial oil cracking process at 850° F. and 750 lbs. per square inch pressure with a reaction period of 22 minutes, producing on a once-through basis, 15% of 420° end point gasoline having an anti-knock rating of 27 octane, fixed gas 12%, and tar 6.5%.

The same charging stock treated at a temperature of 1075° F. at 1300 lbs. per square inch pressure and a reaction period of 1.3 minutes, produced on a once-through basis, 55% of 405° end point gasoline having an anti-knock rating of 77 octane, fixed gas 14%, and tar 6.8%.

One of the objects of the invention is to provide a simple and convenient method and apparatus whereby the oil may be safely and economically treated under conditions of greater pressure and temperature than has heretofore been practical, and such an apparatus is illustrated in Fig. 11 of the drawings.

An electric fluid heater 145 of the type illustrated in Fig. 7 of the drawings is provided. The oil is caused to flow by means of hot oil charging pump 146 to inlet 147 of the heater, under a pressure of 1000 to 1600 lbs. or more per square inch, passing therethrough at high velocity and being discharged from outlet 148 at the desired reaction temperature between 950° and 1200°, the pressure and temperature depending upon the type or kind of oil and the results desired.

Thermostatic device 149, subjected to the influence of the temperature of the oil discharged from heater outlet 148 is provided, operating by means of magnetic switch 150 to control the electric heating current supplied heater 145, thereby maintaining the oil discharged from heater outlet 148 at a predetermined temperature.

Automatic device 151 is provided, operable by the flow of fluid through heater 145, to complete the control circuit of magnetic switch 150, thereby preventing the supply of electric heating current to heater 145 at all times except when the oil is flowing therethrough, thus preventing the overheating or injury to the heating elements of the heater.

Due to the relatively short length of the heating tubes and the high rate of velocity of flow, only a relatively short period of time is required for the oil to pass through the heater which, by reason of the high rate of heat input, is quickly raised to the desired reaction temperature.

When treating certain types of oils in which the reaction due to the pressure and temperature to which the oil is subjected, is very rapid, it is desirable that the oil be immediately cooled below the reaction temperature to terminate the said reaction.

As illustrated in Fig. 11, means are provided for accomplishing this purpose. The oil passes directly from heater tube outlet 148 through pressure releasing valve 152, and by reason of the reduction of pressure, substantially all of the heated oil is immediately converted into vapor, a part of the sensible heat in the liquid being absorbed by the latent heat required to vaporize the oil, thereby substantially reducing the temperature of the liquid and vapor mixture.

Fresh charging stock is forced by means of pump 153 and pipe 154 through mixing device 155 and intimately mixed in the form of a spray with the vapors discharged from pressure reducing valve 152, cooling the cracked vapors and itself being heated and substantially vaporized, passing with the vapors discharged from the pressure reducing valve to expansion chamber 156, whereby means of the reduction in temperature of the vapors, the asphaltic and other undesired high boiling compounds condense and collect in the bottom of expansion chamber 156 where they may be continuously removed by means of outlet 157.

The oil vapors pass from expansion chamber 156 by means of pipe 158 to bubble or fractionating tower 159, where the cooling or quenching oil is condensed with such of the original charging stock as may not be sufficiently reacted upon or cracked, and are collected in the base of the fractionating tower and removed by means of outlet 160 and charged through the electric heating and reaction mechanism by means of hot oil charging pump 146.

The remaining vapors having the desired low boiling point and other characteristics, pass from the fractionating tower 159 by means of pipe 161 to such usual condensing and refining apparatus as is well known in the art.

When treating certain types of oil or those of a more refractory nature, it is desirable to maintain the oil at the selected temperature and pressure for a determinate degree of time, said element of time varying with the kind and type of oil and the results desired, and this may be done by the use of a reactor.

The reactor comprises a plurality of conduits 162, each provided with valves 163 and connected into headers or manifolds 164—165, the total area and length of conduits 162 being such that the time required for the oil to flow therethrough will enable the required reaction in the oil to take place. In the event less time is required, one or more valves 163 may be closed, thereby reducing the effective area provided by conduits and causing the oil to flow at a faster rate and in a shorter period of time.

The lower reactor manifold 165 is of sufficient size to act as a carbon receiver and in which any carbon formed in the cracking or conversion of the oil, will by reason of the relatively slow speed of flow of the oil passing through the reactor, settle out and collect, and from which it may be removed by means of clean-outs 166.

The oil passes from reactor outlet 167 through pressure reducing valve 152, and then proceeds in the same manner by way of cooling or quenching device 155, expansion chamber 156 and fractionating tower 159, as before described.

It is desirable to maintain the oil at a determinate degree of heat during the reaction period and to supply heat to compensate for that lost through radiation from the sides of reactor conduits 162 and also for that absorbed due to the cracking reaction or molecular change in the oil.

Means are provided for this purpose, comprising lugs or terminals 168 welded or otherwise forming electrical connections to the reactor conduits by which electric conductors 169 are connected, by means of which electric heating current is caused to flow from the source of electric power 170 through magnetic switch 171, passing through the metal walls of the conduits 162 comprising the reactor and causing heat to be generated therein.

A thermostatic device 172 is provided, subjected to the temperature of the oil in the reactor and operates to control magnetic switch and the electric heating current supplied reactor conduits, thereby acting to maintain the proper temperature of the oil within the reactor.

It is obvious that in the event the pressure and temperature to which the walls of reactor conduits are subjected should be at too great a degree of heat to be readily withstood by the usual single wall construction, they may be readily constructed in the same manner as illustrated in Figure 1, using a relatively light weight inner tube, heat insulated from the cooler outer pressure resisting wall.

The advantages claimed for the method and apparatus described, are that, by reason of the higher temperatures and pressures employed, and the greater reaction or molecular change in the hydrocarbon produced thereby, the yield of gasoline and other desired low boiling point products and the anti-knock rating of the product is greatly increased, the proportion of fixed gas, tar and other low value products is reduced and by reason of the greater yield per passage through the apparatus and the reduction in the quantity of oil that must be recycled through the apparatus for further treatment, the capacity or output of a given size cracking unit is substantially increased.

While, for simplicity in describing the method and apparatus, means for electrically heating the oil is shown only, in commercial practice, due to the relatively high cost of electric heat, use would be made of gas or oil fired heating means to preheat the oil to the maximum degree possible in such apparatus, before passing to the electric fluid heater. Likewise, the oil charged would preferably be passed through the usual heat exchanging and heat recovery apparatus to save and conserve such heat as may be possible, and in such manner as is well known to the art.

Figure 12:
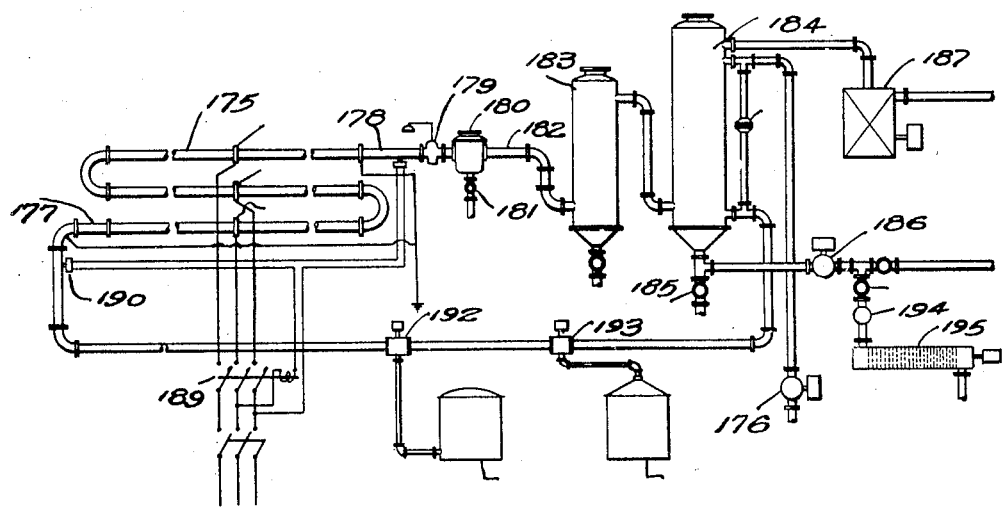
Fig. 12 is a diagrammatic plan view of a fluid heating apparatus of the type illustrated in Figure 7, arranged for the distillation and evaporation of high boiling fluids and compounds.

Figure 12 illustrates an arrangement of apparatus embodying the invention for distilling and evaporating fluids at relatively high temperature and under high pressure, as required in the distillation of oil products, glycerine, the evaporation of acids, caustic chemicals and the like, requiring relatively high temperature and pressure, and that would be injured by prolonged time exposure to the highly heated surfaces of the heating apparatus, but the apparatus is particularly adapted to and will be described as employed in the distillation and treatment of fatty acid used in the manufacture and preparation of industrial oils and fats, soap stocks, etc.

In the usual constructions employed for the distillation of fatty acids, cylindrical stills are used, frequently of 2500 to 5000 gallons capacity in size placed in brick settings and heated by oil or gas fire, and the material consisting of cotton seed, cocoanut or other suitable oil heated to a temperature which may vary from 450 to 625° F., depending upon the nature of the oil, the pressure or vacuum under which distillation takes place and the purpose for which the fatty acid is to be used.

The heated oil vapors pass from the still by means of a pipe to a catch-all where any entrained liquid or solid particles are removed and returned to the still for further treatment, the vapors then pass to a condenser where the fatty acid is condensed and removed; the moisture, entrained air and gases pass on to and are removed by means of a wet vacuum pump, which creates a reduced pressure or vacuum on the system so as to lower the boiling point of the oil and reduce the temperature required to distill or vaporize the fatty acid.

In thus heating the oil in cylindrical stills, the oil in contact with the highly heated still bottom the underside of which is exposed to the intense heat of the furnace, is overheated and cracked or decomposed, resulting in the formation of gas, carbon or pitch and other decomposition products which have little or no commercial value, the amount of pitch and waste products so formed frequently exceeding 25% by weight of the raw material used.

Fresh oil is continuously supplied the still to replace the vapors distilled, until the pitch accumulation in the still is such that the operation is stopped, the fire drawn, the pitch discharged and the still cleaned and made ready for the next run. Usually the stills are drawn every 12 to 18 hours, resulting in considerable loss of the usable material that is mixed with the pitch when discharged, and which due to the high concentration of pitch, may not be economically recovered after removing from the still.

The accumulation of pitch or carbon on the inner surface of the still bottom insulates it from the relatively cool oil within the still and results in overheating the metal, frequently causing it to become weakened until the weight of material in the still causes it to yield and allow the contents of the still to flow into the furnace, causing explosion and fire and sometimes loss of life.

In treating such material, it is desirable that it be subjected to the effect of the high temperature for the minimum period of time and that after being heated to the desired vaporization temperature, it be rapidly cooled below the reaction temperature so as to eliminate or minimize the formation of undesired products that may be formed by prolonged exposure to temperatures at or above the decomposition temperature.

The arrangement of apparatus illustrated in Figure 12, provides means to quickly heat the flowing stream of oil to a temperature that will cause it to become substantially vaporized, thereafter quickly cooling the vapor below its reaction or decomposition temperature, the entire operation of heating, vaporizing and cooling requiring but from 2 to 3 seconds instead of subjecting the material to high temperatures for prolonged period as in methods heretofore used which comprise heating the oil by the batch method in direct fired cylindrical stills.

In Fig. 12 an electric fluid heater 175 of the type illustrated in Fig. 5 of the drawings is provided, the dried oil, preheated by heat exchange with the hot finished oil in the heat exchanger 184, is forced by pump 176 at a rapid rate through the heater 175 by way of inlet 177, and after passing therethrough is discharged through outlet 178 to pressure reducing valve 179, heated to a selected temperature that will cause the oil to become substantially vaporized. The pressure reducing valve 179 may be loaded or otherwise constructed, so that it will act to maintain the desired pressure upon the oil flowing through the heater to keep it in subtsantially a liquid condition.

The temperature to which the oil is heated and the pressure under which it is maintained are such that after passing through pressure reducing valve 179, the sensible heat contained in the oil will be sufficient to supply the latent heat necessary to cause it to become substantially vaporized, the heat thereby extracted causing the resultant vapors to be substantially reduced in temperature.

As an example, when distilling cotton seed oil by the method described, it is caused to pass through heater 175 under a pressure of 750 lbs. per square inch and heated to a discharge temperature of 720° F., under which condition the oil remains substantially in a liquid condition. After passing through pressure reducing valve 179, the oil is subjected to a reduced pressure or vacuum of 20 mm. of mercury by means of vacuum pump 187, under which reduced pressure its boiling point is lowered and the oil becomes substantially vaporized. The heat absorbed in converting the oil from a liquid to a vapor condition, reduces the temperature of the vapor from 720° as discharged from the orifice of pressure reducing valve 139, to approximately 470° F., below the temperature that any substantial decomposition would normally take place.

The amount of decomposition in the oil is a function of the temperature and the time it is subjected to the high reaction temperature. In the construction illustrated a high rate of heat input is employed, the oil is caused to flow through the heater at a rapid rate and as the total length of the heating tubes in heater 175 is relatively short, the time required for the oil to pass from inlet 177 to pressure reducing valve 179 is approximately two seconds, in which time the quantity of decomposition products formed is negligible, thus substantially eliminating the high loss incurred in methods heretofore used by reason of the decomposition of the oil due to prolonged exposure to the high reaction temperatures.

A comparison of the saving of material by reason of the improved method described is illustrated by the following example: Distilling a good grade of cotton seed oil in a commercial plant by means of the usual construction, employing a direct fired cylindrical still, a quantity of pitch or bottoms, useful only as fuel or road oil, equal to 22% of the material processed was produced. Treating a portion of the same material by the continuous high temperature high pressure method outlined above, resulted in the production of but 7% of pitch or bottoms, or the substantial saving of 15% of the raw material.

After passing through the pressure reducing valve 179, the oil vapors pass through catch-all or separator 180, where any unvaporized material will be retained and may be withdrawn by means of valved outlet 181, the vapor then passing by means of pipe 182 to condenser 183, which is maintained at a suitable temperature to condense out any impurities, such as tar or pitch which condense at a higher temperature than the desired fatty acids. The balance of the vapors pass to condenser or heat exchanger 184 through which the relatively cool untreated oil is caused to flow, thereby becoming heated and cooling and condensing the fatty acid vapors, which are then withdrawn in a liquid condition by means of valved outlet 185 and pump 186. The remaining vapors consisting of impurities, gas and entrained air pass to and are removed by wet vacuum pump 187, which serves to maintain a suitable reduced pressure or vacuum on the vapor system.

A thermostatic device 188 is provided, subjected to the temperature of the oil discharged from the heater outlet 178 and acts by means of magnetic switch 189 to so regulate the electric heating current supplied the tubes of high electrical resistance metal comprising the heating elements of heater 175, to keep the oil discharged from the outlet 178 at a substantially uniform temperature.

To protect the heater tubes comprising heater 175 in the event the oil flow through the heater should cease, automatic safety switch 190 is located in inlet 177 of the heater, subjected to the flow of liquid through the heater and acting by means of magnetic switch 189 to interrupt the electric heating current supplied the electric fluid heater in the event the flow of oil should cease or diminish to a degree that may cause overheating of the heater tubes.

In the treatment of fatty material for certain purposes, such as is required in soap and similar products, edible fats and greases, etc., it is desirable to harden or hydrogenate the fatty materials.

In treating fats and oils by means of hydrogen and certain catalysts, the hydrogenation and catalytic reaction is more energetic and takes place in a shorter period of time as the temperature, pressure and turbulence of flow is increased, and therefore because of the conditions under which treatment of the fatty material takes place in this apparatus it is ideal for such operations.

To carry out such a process, means are provided whereby hydrogen and a suitable catalytic agent may be supplied the oil being treated.

As illustrated in Fig. 12, a metallic catalyst, comprising nickel or other suitable material in a finely divided form, may be continuously supplied by means of feeding device 192, comprising, preferably, a screw or pump mechanism that will continuously supply the catalyst in a predetermined amount, which may be from 0.1% to 0.2% by weight of the oil being treated, or any other suitable quantity depending upon the type and form of catalyst employed, the kind of oil and the purpose for which the finished product is intended.

Likewise the device 193 is provided, comprising means for continuously supplying a predetermined volume of hydrogen which may vary from .6 to .8 cubic foot or more per pound of oil treated, to the flowing stream of oil, the amount of the catalyst and hydrogen supplied being so proportioned to the volume of oil passing through the heater, that the desired reaction and change in the oil will take place and convert the fatty material to a compound of the desired hardness, iodine value, melting point and other characteristics.

The hydrogen and catalyst are therefore intimately mixed with the stream of oil flowing rapidly and with extreme turbulence through the heater, and under such condition of temperature and pressure that the hydrogenation and catalytic reaction is practically instantaneous, the said reaction being substantially completed during the time required for the oil to pass from heater inlet 177 to pressure reducing valve 179, and cooler 183 where the oil is reduced to a temperature where the reaction will substantially cease.

The material then passes to receiver 184 where the fatty material together with the catalyst is withdrawn through outlet 185 by pump 186, and passed through centrifuge 194 and filter press 195 (only shown diagrammatically) where the catalyst is recovered for further use, the filtered fatty material passing to the usual apparatus for deodorizing and other treatment well known to the art.

The remaining vapors containing the excess or unused hydrogen, together with the entrained air, gas, etc., pass to and are discharged from vacuum pump 187 from which the hydrogen may be recovered for further use.

While the invention has been described particularly with reference to the treatment of gases and liquids, it is obvious that its use may be extended to other fields in which it is desired to subject materials which may be solids, which may be caused to flow in a finely divided state, by mixing them with a suitable liquid or gaseous fluid vehicle.

In this specification and claims the terms "quickly heated" and "rapidly flowing stream" are relative. Using the described electrically heated mechanisms, heat inputs at the rate of 100,000 B. t. u. or more per square foot of heating surface per hour may be utilized, and to obtain a desired heating capacity a relatively short total length of heater tube is required, which combined with the rate or flow of material through the tube in the order of 10 to 20 feet per second results in an extremely short interval of time, or of the order of a fraction to a few seconds, to raise the flowing stream to the desired temperature and due to the rapid rate of flow it may be also quickly cooled below its reaction temperature, thus minimizing the formation of undesired side products resulting from prolonged heat exposure. The above rates of heating compare with inputs of 10,000 to 14,000 B. t. u. per square foot per hour when utilizing usual or direct fired methods of heating, which method requires from eight to ten times longer periods of time to heat the material and is also not subject to the accuracy of control or uniformity of heating surface temperature as in the mechanisms herein described.

It will be obvious that many other embodiments of the invention may be made by those skilled in the art and it will be therefore understood that the particular devices and arrangements shown and described herein are of an illustrative character and are not restrictive and that various changes in form, construction, arrangement of parts, and methods of use, may be made within the spirit and scope of the following claims.

I claim:

1. An apparatus for heating fluids to high temperature under high pressure, comprising a rigid tubular casing capable of withstanding the pressure to be used, an electrical conducting tube within said casing for conducting the fluid to be treated through the casing, connections for supplying electric current to said tube to heat it to a high temperature, and means to equalize the pressure inside of said tube and inside of said casing.

2. An apparatus for heating fluids to high temperature under high pressure, comprising a rigid tubular casing capable of withstanding the pressure to be used, an electrical conducting tube within said casing for conducting the fluid to be treated through the casing, connections for supplying electric current to said tube to heat it to a high temperature, and means to equalize the pressure inside of said tube and inside of said casing comprising an opening through the wall of said tube.

3. An apparatus for heating fluids to high temperature under high pressure, comprising a rigid tubular casing capable of withstanding the pressure to be used, an electrical conducting tube within said casing for conducting the fluid to be treated through the casing, connections for supplying electric current to said tube to heat it to a high temperature, means to equalize the pressure inside of said tube and inside of said casing, and heat insulation between said tube and said casing for insulating the latter against the heat admitted by the tube.

4. A heating apparatus for continuously treating fluids, comprising a rigid tubular casing having a wall capable of withstanding high fluid pressure at elevated temperature, a tube for the fluid of relatively small cross sectional area within said casing extending in substantial parallelism with the axis of said casing, means for heating a section of said tube within said casing to a temperature sufficiently high to raise the fluid flowing therethrough to a selected reaction temperature, means for causing the fluid to flow through said tube at a rapid rate under a pressure correlated to the selected temperature to produce a desired reaction, means for equalizing the fluid pressure upon the inner and the outer surface of said heating section, and means to deliver the heated fluid from said tube.

5. A heating apparatus for continuously treating fluids comprising a tubular casing having a wall capable of withstanding high fluid pressure at elevated temperature, a tube for the fluid having a heating section within said casing extending in substantial parallelism with the axis of said casing and having a relatively thin wall of high electrical resistance material, means for supplying an electric heating current to said section operable to heat the fluid flowing therethrough quickly to a selected reaction temperature, means for equalizing the pressure upon the inner and outer surfaces of said heating section, means for causing the fluid to flow through said tube at a rapid rate under a pressure correlated to said selected temperature to produce a desired reaction, and means to deliver the heated fluid from said tube.

6. A heating apparatus for continuously treating fluids, comprising a tubular casing having a wall capable of withstanding high fluid pressure at elevated temperature, a tube for the fluid having a heating section within said casing extending in substantial parallelism with the axis of said casing and having a relatively thin wall of high electrical resistance material, means for supplying an electric heating current to said section operable to heat the fluid flowing therethrough quickly to a selected reaction temperature, insulating means substantially filling the space between said tube and said tubular casing, means for equalizing the pressure upon the inner and outer surfaces of said heating section, means for causing the fluid to flow through said tube at a rapid rate under a pressure correlated to said selected temperature to produce a desired reaction, means for automatically maintaining substantially constant the correlation between the selected reaction temperature and said pressure, and means to deliver the heated fluid from said tube.

7. A heating apparatus for continuously treating fluids, comprising a tubular casing having walls capable of withstanding high fluid pressure at elevated temperature, a conduit for the fluid having a heating section within said casing extending in substantial parallelism with the axis of said casing and having a relatively thin wall of high electrical resistance material, means for supplying an electric heating current to said section operable to heat the fluid flowing therethrough quickly to a selected reaction temperature, insulating means substantially filling the space between said conduit and said tubular casing, means for equalizing the pressure upon the inner and outer surfaces of said heating section, means for causing the fluid to flow through said tube at a rapid rate under a pressure correlated to said selected temperature to produce a desired reaction, means for automatically maintaining substantially constant the correlation between the selected reaction temperature and said pressure, thermostatic means subjected to substantially the maximum temperature of the fluid discharged from said tube operable to control the electric heating current supplied said tube, means automatically operable by the flow of fluid through said tube to cause the electric heating current to be supplied said tube and to prevent supply of said electric current upon substantial cessation of said flow, an expansion chamber and means to deliver the heated fluid to said expansion chamber and means for collecting the products produced in said fluid by said reaction.

8. A heating apparatus for continuously treating fluids, comprising a tubular casing having walls capable of withstanding high fluid pressure at elevated temperature, a tube for the fluid having a heating section within said casing extending in substantial parallelism with the axis of said casing and having a relatively thin wall of high electrical resistance material, means for supplying an electric heating current to said section operable to heat the fluid flowing therethrough quickly to a selected reaction temperature, insulating means substantially filling the space between said tube and said tubular casing, means for equalizing the pressure upon the inner and outer surfaces of said heating section, means for causing the fluid to flow through said tube at a rapid rate under a pressure correlated to said selected temperature to produce a desired reaction, means for automatically maintaining substantially constant the correlation between the selected reaction temperature and said pressure, a reactor communicating with the discharge end of said tube having a relatively larger cross sectional area than that of said tube operable to reduce the rate of flow of said fluid to permit a desired completion of the reaction under substantially the same fluid pressure, an expansion chamber and means to deliver the heated fluid to said expansion chamber and means for collecting the products produced in said fluid by said reaction.

9. A heating apparatus for continuously treating fluid, comprising a tubular casing having walls capable of withstanding high fluid pressure at elevated temperature, a tube for the fluid having a heating section within said casing extending in substantial parallelism with the axis of said casing and having a relatively thin wall of high electrical resistance material, means for supplying an electric heating current to said section operable to heat the fluid flowing therethrough quickly to a selected reaction temperature, insulating means substantially filling the space between the said tube and said tubular casing, means for equalizing the pressure upon the inner and outer surfaces of said heating section, means for causing the fluid to flow through said tube at a rapid rate under a pressure correlated to said selected temperature to produce a desired reaction, means for automatically maintaining substantially constant the correlation between the selected reaction temperature and said pressure, thermostatic means subjected to substantially the maximum temperature of the fluid discharged from said conduit operable to control the electric heating current supplied said tube, means automatically operable by the flow of fluid through said tube to cause the electric heating current to be supplied said conduit and to prevent supply of said electric current upon substantial cessation of said flow, a reactor communicating with the discharge end of said tube having a relatively larger cross sectional area than that of said tube operable to reduce the rate of flow of said fluid to permit a desired completion of the reaction under substantially the same fluid pressure, electrical means for maintaining said reactor at a selected temperature correlated to the pressure of the fluid, an expansion chamber, means to deliver the heated fluid to said expansion chamber and means for collecting the products produced in said fluid by said reaction.

10. A heating apparatus for continuously treating fluids comprising a tube for the fluid having a metallic wall of high electric resistance capable of withstanding high fluid pressure at elevated temperature, means for supplying an electric heating current to said tube operable to heat the fluid flowing therethrough quickly to a selected reaction temperature, means for causing the fluid to flow through said tube at a rapid rate under a pressure correlated to said selected temperature to produce a desired reaction, and means to deliver the heated fluid from said tube.

11. A heating apparatus for continuously treating fluids comprising a tube for the fluid having a metallic wall of high electric resistance capable of withstanding high fluid pressure at elevated temperature, means for supplying an electric heating current to said tube operable to heat the fluid flowing therethrough quickly to a selected reaction temperature, means for causing a fluid to flow through said tube at a rapid rate under a pressure correlated to said selected temperature to produce a desired reaction, means automatically operable by the flow of fluid through said tube to cause the electric heating current to be supplied said tube and to prevent supply of said electric current upon substantial cessation of said flow, and means to deliver the heated fluid from said tube.

12. A heating apparatus for continuously treating fluids comprising a tube for the fluid having a metallic wall of high electric resistance capable of withstanding high fluid pressure at elevated temperature, means for supplying an electric heating current to said tube operable to heat the fluid flowing therethrough quickly to a selected reaction temperature, means for causing the fluid to flow through said tube at a rapid rate under a pressure correlated to said selected temperature to produce a desired reaction, means for automatically maintaining substantially constant the correlation between the selected reaction temperature and said pressure, means automatically operable by the flow of fluid through said tube to cause the electric heating current to be supplied said tube and to prevent supply of said electric current upon substantial cessation of said flow, an expansion chamber, means to deliver the heated fluid to said expansion chamber and means for collecting the products produced in said fluid by said reaction.

13. A heating apparatus for continuously treating fluids comprising a tube for the fluid having a metallic wall of high electric resistance capable of withstanding high fluid pressure at elevated temperature, means for supplying an electric heating current to said tube operable to heat the fluid flowing therethrough quickly to a selected reaction temperature, means for causing the fluid to flow through said tube at a rapid rate under a pressure correlated to said selected temperature to produce a desired reaction, means for automatically maintaining substantially constant the correlation between the selected reaction temperature and said pressure, thermostatic means subjected to substantially the maximum temperature of the fluid discharged from said tube operable to control the electric heating current supplied said tube, means automatically operable by the flow of fluid through said tube to cause the electric heating current to be supplied said tube and to prevent supply of said electric current upon substantial cessation of said flow, a reactor communicating with the discharge end of said tube having a relatively larger cross sectional area than that of said tube operable to reduce the rate of flow of said fluid to permit a desired completion of the reaction under substantially the same fluid pressure, an expansion chamber, means to deliver the heated fluid to said expansion chamber and means for collecting the products produced in said fluid by said reaction.

14. A heating apparatus for continuously treating fluids comprising a tube for the fluid having a metallic wall of high electric resistance capable of withstanding high fluid pressure at elevated temperature, means for supplying an electric heating current to said tube operable to heat the fluid flowing therethrough quickly to a selected reaction temperature, means for causing the fluid to flow through said tube at a rapid rate under a pressure correlated to said selected temperature to produce a desired reaction, means for automatically maintaining substantially constant the correlation between the selected reaction temperature and said pressure, thermostatic means subjected to substantially the maximum temperature of the fluid discharged from said tube operable to control the electric heating current supplied said conduit, means automatically operable by the flow of fluid through said tube to cause the electric heating current to be supplied said tube and to prevent supply of said electric current upon substantial cessation of said flow, a reactor communicating with the discharge end of said tube having a relatively larger cross sectional area than that of said tube operable to reduce the rate of flow of said fluid to permit a desired completion of the reaction under substantially the same fluid pressure, means for maintaining said reactor at a selected degree of heat correlated to the pressure of said fluid, means to deliver the fluid from said reactor, and means for collecting the products produced in said fluid by said reaction.

15. A heating apparatus for continuously treating fluid comprising a tube for the fluid having a metallic wall of high electrical resistance capable of withstanding high fluid pressure at elevated temperature, means for supplying an electric heating current to said tube operable to heat the fluid flowing therethrough quickly to a selected reaction temperature, means for causing the fluid to flow through said tube at a rapid rate under a pressure correlated to said selected temperature to produce a desired reaction, means for automatically maintaining substantially constant the correlation between the selected reaction temperature and said pressure, thermostatic means subjected to substantially the maximum temperature of the fluid discharged from said tube operable to control the electric heating current supplied said tube, means automatically operable by the flow of fluid through said tube to cause the electric heating current to be supplied said tube and to prevent supply of said electric current upon substantial cessation of said flow, a reactor communicating with the discharge end of said tube having a relatively larger cross sectional area than that of said tube operable to reduce the rate of flow of said fluid to permit a desired completion of the reaction under substantially the same fluid pressure, means for maintaining said reactor at a selected degree of heat correlated to the pressure of said fluid, an expansion chamber, means to deliver the heated fluid to said expansion chamber and means for collecting the products produced in said fluid by said reaction.

16. A heating apparatus for continuously treating fluids, comprising a tubular casing having a wall capable of withstanding high fluid pressure at elevated temperature, a plurality of tubes for the fluid having heating sections within said casing extending in substantial parallelism with the axis of said casing and having relatively thin walls of high electrical resistance material, means for supplying an electric heating current to said sections operable to heat the fluid flowing therethrough quickly to a selected reaction temperature, means for causing the fluid to flow through said tubes in a predetermined direction at a rapid rate under a pressure correlated to said selected temperature, and means to deliver the heated fluid from said tubes.

17. A heating apparatus for continuously treating fluids, comprising a tubular casing having a wall capable of withstanding high fluid pressure at elevated temperature, a plurality of tubes for the fluid having heating sections within said casing extending in substantial parallelism with the axis of said casing and having relatively thin walls of high electrical resistance material, means for supplying an electric heating current to said sections operable to heat the fluid flowing therethrough quickly to a selected reaction temperature, insulating means substantially filling the space between said tubes and said tubular casing, means for equalizing the fluid pressure upon the inner and outer surfaces of said heating sections, means for causing the fluid to flow through said tube in a predetermined direction at a rapid rate under a pressure correlated to said selected temperature, means for automatically maintaining substantially constant the correlation between the selected reaction temperature and said pressure, and means to deliver the heated fluid from said tube.

18. A heating apparatus for continuously treating fluids, comprising a tubular casing having a wall capable of withstanding high fluid pressure at elevated temperature, a plurality of tubes for the fluid having heating sections within said casing extending in substantial parallelism with the axis of said casing and having relatively thin walls of high electrical resistance material, means for supplying an electric heating current to said sections operable to heat the fluid flowing therethrough quickly to a selected reaction temperature, insulating means substantially filling the space between said tubes and said tubular casing, means for equalizing the fluid pressure upon the inner and outer surfaces of said heating sections, means for causing the fluid to flow through said tubes in a predetermined direction at a rapid rate under a pressure correlated to said selected temperature, means for automatically maintaining substantially constant the correlation between the selected reaction temperature and said pressure, thermostatic means subjected to substantially the maximum temperature of the fluid discharged from said tubes operable to control the electric heating current supplied said tubes, means automatically operable by the flow of fluid through said conduit to cause the electric heating current to be supplied said tubes and to prevent supply of said electric current upon substantial cessation of said flow, means to deliver the heated fluid from said tubes, and means for collecting the products in said fluid by said reaction.

19. A heating apparatus for continuously treating fluids, comprising a tubular casing having a wall capable of withstanding high fluid pressure at elevated temperature, a plurality of tubes for the fluid having heating sections within said casing extending in substantial parallelism with the axis of said casing and having relatively thin walls of high electrical resistance material, means for supplying an electric heating current to said sections operable to heat the fluid flowing therethrough quickly to a selected reaction temperature, insulating means substantially filling the space between said tubes and said tubular casing, means for equalizing the fluid pressure upon the inner and outer surfaces of said heating sections, means for causing the fluid to flow through said tubes in a predetermined direction at a rapid rate under a pressure correlated to said selected temperature, means for automatically maintaining substantially constant the correlation between the selected reaction temperature and said pressure, thermostatic means subjected to substantially the maximum temperature of the fluid discharged from said tubes operable to control the electric heating current supplied said tubes, means automatically operable by the flow of fluid through said tubes to cause the electric heating current to be supplied said tubes and to prevent supply of said electric current upon substantial cessation of said flow, and an expansion chamber, means to deliver the heated fluid to said expansion chamber and means for collecting the products produced in said fluid by said reaction.

20. A heating apparatus for continuously treating fluids, comprising a tubular casing having a wall capable of withstanding high fluid pressure at elevated temperature, a plurality of tubes for the fluid having heating sections within said casing extending in substantial parallelism with the axis of said casing and having relatively thin walls of high electrical resistance material, means for supplying an electric heating current to said sections operable to heat the fluid flowing therethrough quickly to a selected reaction temperature, insulating means substantially filling the space between said tubes and said tubular casing, means for equalizing the fluid pressure upon the inner and outer surface of said heating sections, means for causing the fluid to flow through said tube in a predetermined direction at a rapid rate under a pressure correlated to said selected temperature, means for automatically maintaining substantially constant the correlation between the selected reaction temperature and said pressure, thermostatic means subjected to substantially the maximum temperature of the fluid discharged from said tube operable to control the electric heating current supplied said tube, means automatically operable by the flow of fluid through said tube to cause the electric heating current to be supplied said tube and to prevent supply of said electric current upon substantial cessation of said flow, a reactor communicating with the discharge end of said conduit having a relatively larger cross sectional area than that of said tube operable to reduce the rate of flow of said fluid to permit a desired completion of the reaction under substantially the same fluid pressure, means to deliver the heated fluid from said reactor, and means for collecting the products produced in said fluid by said reaction.

21. A heating apparatus for continuously treating fluids, comprising a tubular casing having a wall capable of withstanding high fluid pressure at elevated temperature, a plurality of tubes for the fluid having heating sections within said casing extending in substantial parallelism with the axis of said casing and having relatively thin walls of high electrical resistance material, means for supplying an electric heating current to said sections operable to heat the fluid flowing therethrough quickly to a selected reaction temperature, insulating means substantially filling the space between said tubes and said tubular casing, means for equalizing the fluid pressure upon the inner and outer surfaces of said heating sections, means for causing the fluid to flow through said tube in a predetermined direction at a rapid rate under pressure correlated to said selected temperature, means for automatically maintaining substantially constant the correlation between the selected reaction temperature and said pressure, thermostatic means subjected to substantially the maximum temperature of the fluid discharged from said conduit operable to control the electric heating current supplied said tubes, means automatically operable by the flow of fluid through said tubes to cause the electric heating current to be supplied said tubes and to prevent supply of said electric current upon substantial cessation of said flow, a reactor communicating with the discharge end of said tubes having a relatively larger cross sectional area than that of said tubes operable to reduce the rate of flow of said fluid to permit a desired completion of the reaction under substantially the same fluid pressure, electrical means for maintaining said reactor at a selected temperature correlated to the pressure of said fluid, an expansion chamber, means to deliver the heated fluid to said expansion chamber and means for collecting the products produced in said fluid by said reaction.

ROBERT A. CARLETON.